(12) United States Patent
Natsume et al.

(10) Patent No.: US 7,394,810 B2
(45) Date of Patent: Jul. 1, 2008

(54) LAYER 2 SWITCH AND METHOD OF PROCESSING EXPANSION VLAN TAG OF LAYER 2 FRAME

(75) Inventors: Hidefumi Natsume, Tokyo (JP); Yasutaka Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 840 days.

(21) Appl. No.: 10/700,451

(22) Filed: Nov. 5, 2003

(65) Prior Publication Data

US 2004/0095941 A1    May 20, 2004

(30) Foreign Application Priority Data

Nov. 5, 2002    (JP)    ............. 2002-321888

(51) Int. Cl.
  *H04L 12/28*    (2006.01)
  *H04L 12/56*    (2006.01)
(52) U.S. Cl. ..................... 370/392; 370/389
(58) Field of Classification Search ........... None
  See application file for complete search history.

(56) References Cited

U.S. PATENT DOCUMENTS

| | | | |
|---|---|---|---|
| 6,219,699 | B1 | 4/2001 | McCloghrie et al. |
| 2004/0047300 | A1* | 3/2004 | Enomoto et al. ............ 370/256 |
| 2004/0047353 | A1* | 3/2004 | Umayabashi et al. .. 370/395.63 |
| 2004/0160904 | A1* | 8/2004 | Enomoto et al. ............ 370/256 |
| 2005/0058132 | A1* | 3/2005 | Okano et al. ................ 370/389 |

FOREIGN PATENT DOCUMENTS

| | | |
|---|---|---|
| JP | 11-331237 | 11/1999 |
| JP | 2001-500345 | 1/2001 |

* cited by examiner

*Primary Examiner*—Ronald Abelson
(74) *Attorney, Agent, or Firm*—Young & Thompson

(57) ABSTRACT

A layer 2 switch enables communication between different layer 2 networks by rewriting an expansion VLAN tag according to a network of a frame transfer destination, as well as producing the same effect, by rewriting an expansion VLAN tag, as that obtained by applying expansion VLAN tags to the third and the following stages.

21 Claims, 9 Drawing Sheets

FIG. 5

PRIMARY TABLE

| MAC ADDRESS | OUTPUT LINE CARD | OUTPUT LINE | SWAP SETTING |
|---|---|---|---|
| 0x000000000001 | 1 | 1 | 1 |
| 0x000000000002 | 2 | 2 | 0 |
| 0x000000000003 | 3 | 2 | 1 |
| ... | ... | ... | ... |
| 0x000000000003 | 3 | 2 | 1 |

SECONDARY TABLE A (FOR AREA (1) RECEPTION)

| ETHER TYPE | EVID | PORT BITMAP | ETHER TYPE | EVID | PORT BITMAP |
|---|---|---|---|---|---|
| 0x9100 | 1024 | 10101... | 0x9200 | 15 | 10101... |
| 0x9100 | 1200 | ... | 0x9200 | 15 | ... |
| 0x9100 | 10 | ... | 0x9200 | 10 | ... |
| ... | ... | ... | ... | ... | ... |
| 0x9100 | 15 | ... | 0x9200 | 1024 | ... |

AREA (1) — AREA (2) — 4096

SECONDARY TABLE B (FOR AREA (2) RECEPTION)

| ETHER TYPE | EVID | PORT BITMAP | ETHER TYPE | EVID | PORT BITMAP |
|---|---|---|---|---|---|
| 0x9200 | 1024 | 10101... | 0x9100 | 15 | 10101... |
| 0x9200 | 1200 | ... | 0x9100 | 15 | ... |
| 0x9200 | 10 | ... | 0x9100 | 10 | ... |
| ... | ... | ... | ... | ... | ... |
| 0x9200 | 15 | ... | 0x9100 | 1024 | ... |

AREA (2) — AREA (1) — 4096

IN BOTH OF SECONDARY TABLES A AND B, THE SAME VALUE CAN BE SET AS ETHER TYPE

FIG. 7

SECONDARY TABLE A (FOR AREA (1) RECEPTION)

| ETHER TYPE | EVID | PORT BITMAP | ETHER TYPE | EVID | PORT BITMAP |
|---|---|---|---|---|---|
| 0x9100 | 10 | 10101··· | 0x9200 | 15 | 10101··· |
|  |  |  | 0x9300 | 15 | ··· |
|  |  |  | 0x9400 | 10 | ··· |
|  |  |  | ··· | ··· | ··· |
|  |  |  | 0x9999 | 1024 | ··· |
| 0x9100 | 4000 | 10101··· | 0x9200 | 11 | 10101··· |
|  |  |  | 0x9300 | 16 | ··· |
|  |  |  | 0x9400 | 9 | ··· |
|  |  |  | ··· | ··· | ··· |
|  |  |  | 0x9999 | 1025 | ··· |

{ AREA (1) } { OTHER AREA THAN AREA (1) — (N−1) }
Total: 4096

SECONDARY TABLE B (FOR RECEPTION OF OTHER AREA THAN AREA (1))

| ETHER TYPE | EVID | PORT BITMAP | ETHER TYPE | EVID | PORT BITMAP |
|---|---|---|---|---|---|
| 0x9200 | 1024 | 10101··· | 0x9100 | 15 | 10101··· |
| 0x9200 | 1200 | ··· | 0x9100 | 15 | ··· |
| 0x9200 | 10 | ··· | 0x9100 | 10 | ··· |
| ··· | ··· | ··· | ··· | ··· | ··· |
| 0x9200 | 15 | ··· | 0x9100 | 1024 | ··· |

Total: 4096

WIDE AREA ETHERNET NETWORK

LAYER 2 SWITCH AND METHOD OF PROCESSING EXPANSION VLAN TAG OF LAYER 2 FRAME

BACKGROUND OF THE INVENTION

1. Field of the Invention

The present invention relates to a layer 2 switch (hereinafter referred to as L2SW) which terminates a layer 2 frame (hereinafter referred to as Ethernet frame) and, more particularly, to improvement in a method of processing an expansion VLAN tag applied to an Ethernet frame for expansion.

2. Description of the Related Art

Expansion VLAN technique is a technique developed for employing VLAN techniques used in a conventional L2SW to individually separate users in a wide area Ethernet for the use as VPN. With a local area network divided into segments, VLAN has been originally used as a means for shutting up an Ethernet broadcast frame or a means for ensuring security. In order to meet a demand from communication service providers for making use of the VLAN techniques for VPN for the purpose of individually separating users accommodated in a network in wide area Ethernet service, communication apparatus manufactures have developed the techniques on their own. In addition, while IP-VPN techniques have been conventionally used, wide area Ethernet service is attracting more and more attention because of apparatus introduction costs, operation costs, facility of introduction and the degree of freedom to make the communication service providers consider introduction of various kinds of services using the VLAN techniques.

In wide area networks provided by communication service providers, one communication service provider's network is divided into a plurality of small areas.

This arrangement is made, in order to avoid a problem that an expansion VLAN is capable of accommodating 4096 users at the maximum because the expansion VLAN employs the same tag format as that of a common VLAN, for the purpose of ensuring expandability in a provider's network as a whole by dividing one area into small units to limit the number of users accommodated in each area.

As shown in FIG. 8, the entire network is structured to have Ethernet networks each set up in each area connected with each other through an L2SW. Each area is an independent LAN in which as many as 4096 VLAN can be set. When transmitting and receiving data to bridge the areas, once delete an expansion VLAN tag at an exit of each area and add, at an entrance of a next area, an expansion VLAN tag inherent to the area.

In addition, as shown in FIG. 9, another method is considering each area as a layer to sequentially add/delete an expansion VLAN tag when moving through the layers. In this case, the higher a layer goes up in hierarchy, the more are applied the expansion VLAN tags.

One of conventional art similar to the present invention is that recited in Kohyo (National Publication of Translated Version) No. 2001-500345.

With a system shown in FIG. 9, because an expansion VLAN tag is inserted every time a layer goes up in hierarchy, an overhead in an Ethernet frame (other part than data) is increased. This results in having a compressed band in the network to adversely affect L2SW processing performance.

In addition, since many of communication service providers set the maximum frame length allowed by an L2SW in a network to be 1522 or 1526 bytes, setting of all the L2SW in the network should be changed. Furthermore, because old type devices fail to cope with such an expansion VLAN system, setting change is not enough to be adapted to the system, so that replacement of the apparatus will be required.

With the system shown in FIG. 8, it is necessary to arrange L2SW for gate way at each of an entrance and an exit of each area to connect the areas.

As a result, the number of L2SWs is increased in the entire network to invite an increase in operation costs of the apparatus.

SUMMARY OF THE INVENTION

An object of the present invention is to provide a layer 2 switch and a method of processing an expansion VLAN tag of a layer 2 frame which suppress, by swapping (rewriting) an expansion VLAN tag applied to a second stage of a layer 2 frame, an increase in overhead caused by multi-stacking which is a problem of a conventional system, while obtaining the same effect as that attained by applying expansion VLAN tags (a plurality of expansion VLAN tags) to the third and the following stages.

According to the first aspect of the invention, a layer 2 switch which conducts processing of terminating a layer 2 frame and processing of a layer 2 frame in which an expansion VLAN tag is stacked, comprising a unit which, when a transmission destination area of the frame is different from a transmission source area, rewrites the expansion VLAN tag of the frame into an expansion VLAN tag of the transmission destination area.

According to another aspect of the invention, a method of termination processing of a layer 2 frame and of processing an expansion VLAN tag of a layer 2 frame in which an expansion VLAN tag is stacked, comprising the step of rewriting, when a transmission destination area of the frame is different from a transmission source area, the expansion VLAN tag of the frame into an expansion VLAN tag of the transmission destination area.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is a diagram showing table arrangement according to the first embodiment of the present invention;

FIG. 7 is a diagram showing table arrangement according to the second embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Embodiments of the present invention will be detailed with reference to the accompanying drawings in the following in order to clarify the foregoing and other objects, features and effects of the present invention.

Figure 1:
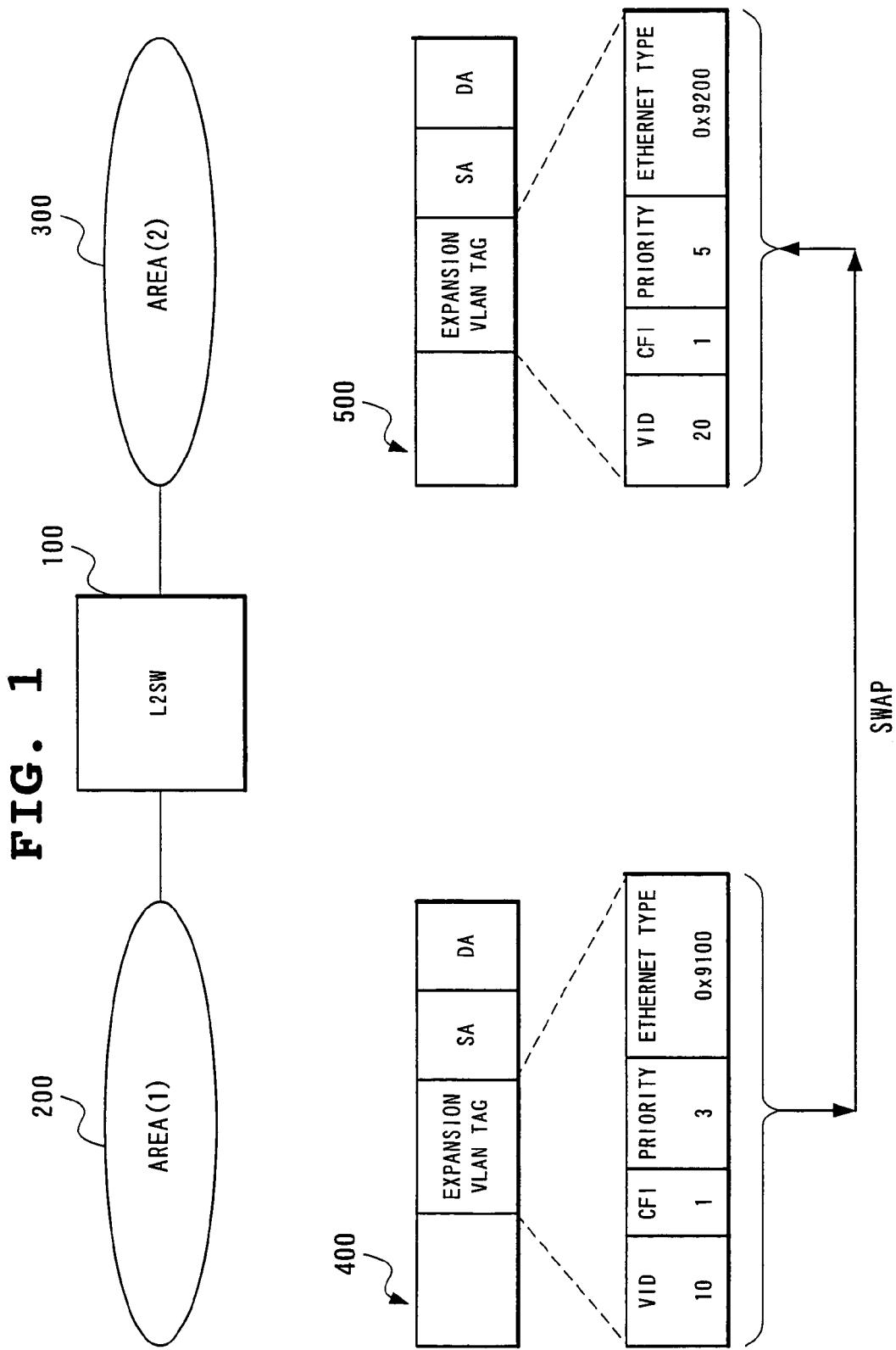
FIG. 1 is a diagram showing SWAP operation of an expansion VLAN tag according to a first embodiment of the present invention.

FIG. 1 shows an L2SW 100 mounted with an expansion VLAN tag swapping function as a first embodiment of the present invention.

The present L2SW 100 mounted with the expansion VLAN tag swapping function accommodates a plurality of Ethernet lines to one-to-one connect an area (1) 200 network and an area (2) 300 in a wide area Ethernet network. FIG. 1 shows how an expansion VLAN tag in a frame 400, when the frame 400 is received from the area (1) 200 and transmitted toward the area (2) 300, is rewritten. The frame 400 received from the area (1) 200 has its header information analyzed inside the device of the L2SW 100 to obtain transmission destination line information (about to which line of which line card the frame is to be output) and then the frame is transferred to the relevant line.

Figure 2:
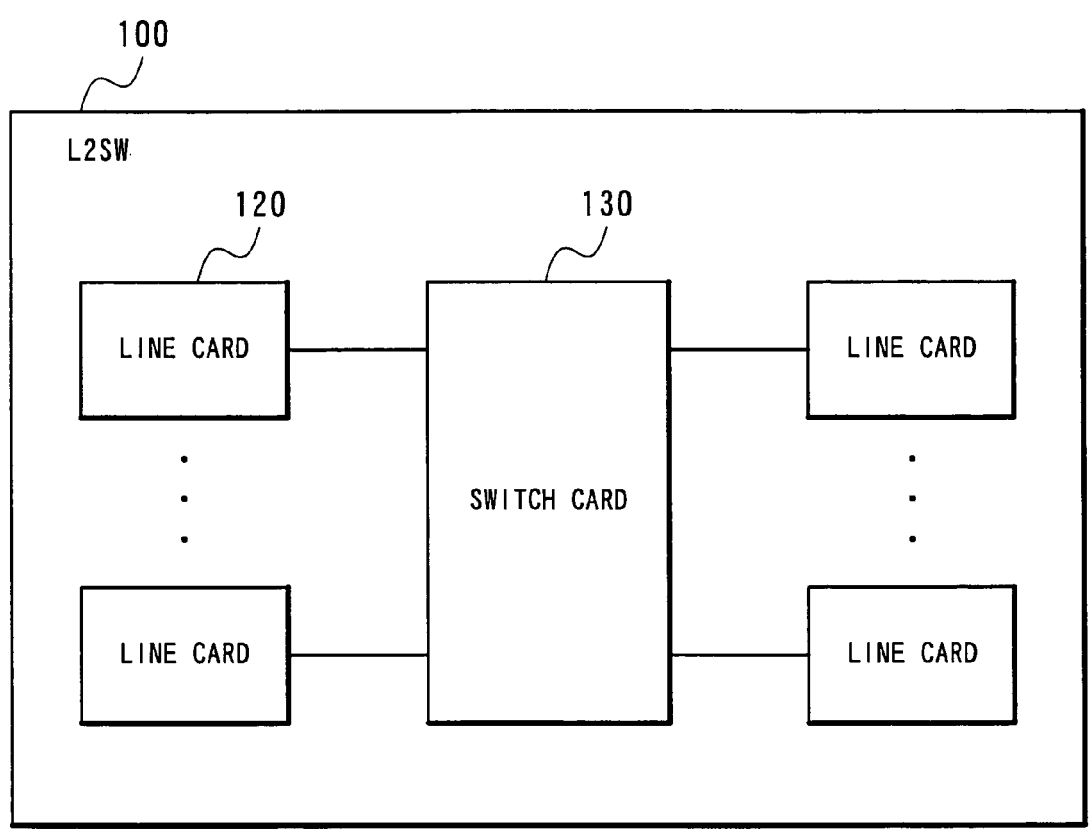
FIG. 2 is an internal block diagram of an L2SW according to the first embodiment of the present invention.

FIG. 2 shows a block diagram showing an internal structure of the L2SW 100.

The L2SW 100 mounted with the expansion VLAN function includes a line card 120 having a function of analyzing header information of a frame to obtain transmission destination line information (about to which line of which line card the frame is to be output) and converting the frame into a switching cell to output the cell to a switch card 130 and a function of converting a cell received from the switch card 130 into a frame and sending the frame to a relevant line based on the transmission destination line information, and the switch card 130 for conducting switching processing of a cell applied from the line card 120 based on the transmission destination line information to output the cell to the relevant line card 120.

Then, according to the present invention, when determination of frame output path information results in finding that a transmission destination line is in an area different from that of a received frame, the line card 120 conducts processing of rewriting (swapping) information (Ether type, VID) of an expansion VLAN tag in the frame into information (Ether type, VID) of an expansion VLAN tag of the transmission destination area.

Figure 3:
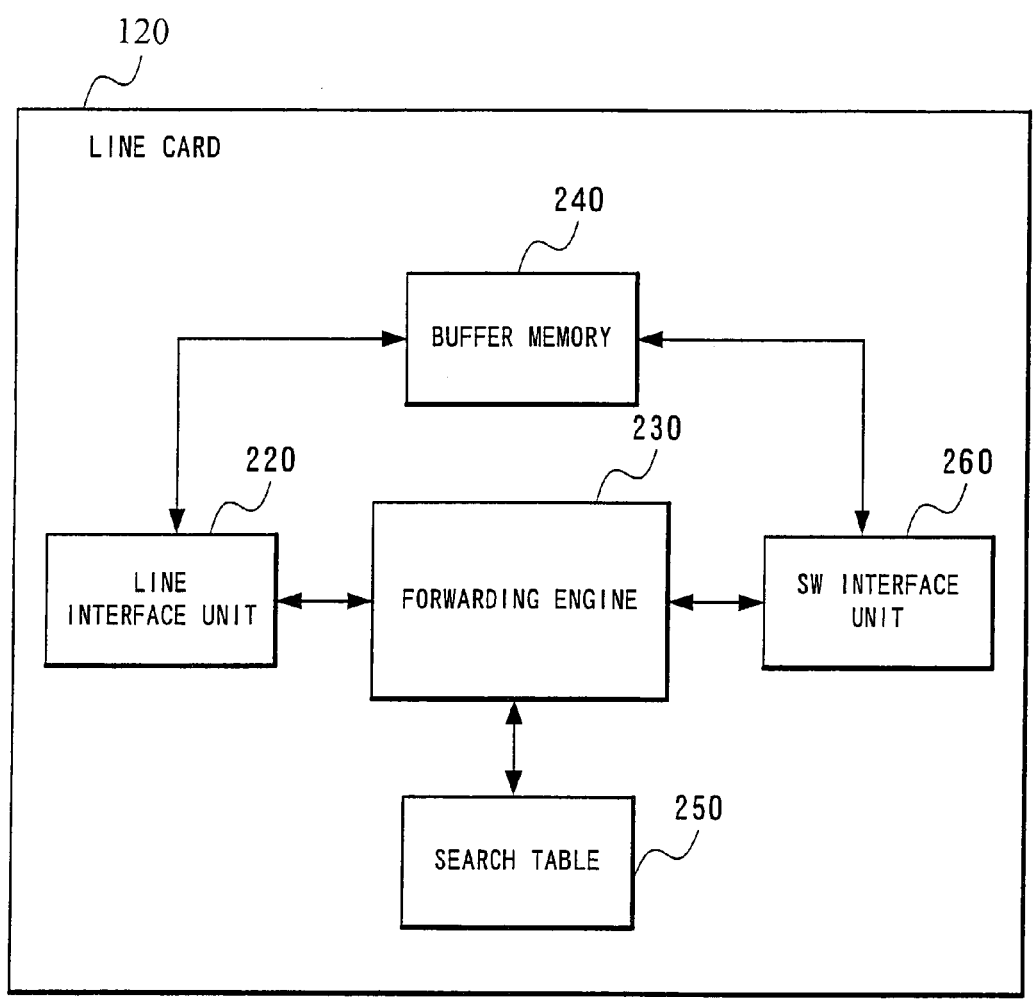
FIG. 3 is an internal block diagram of a line card according to the first embodiment of the present invention.
Figure 4:
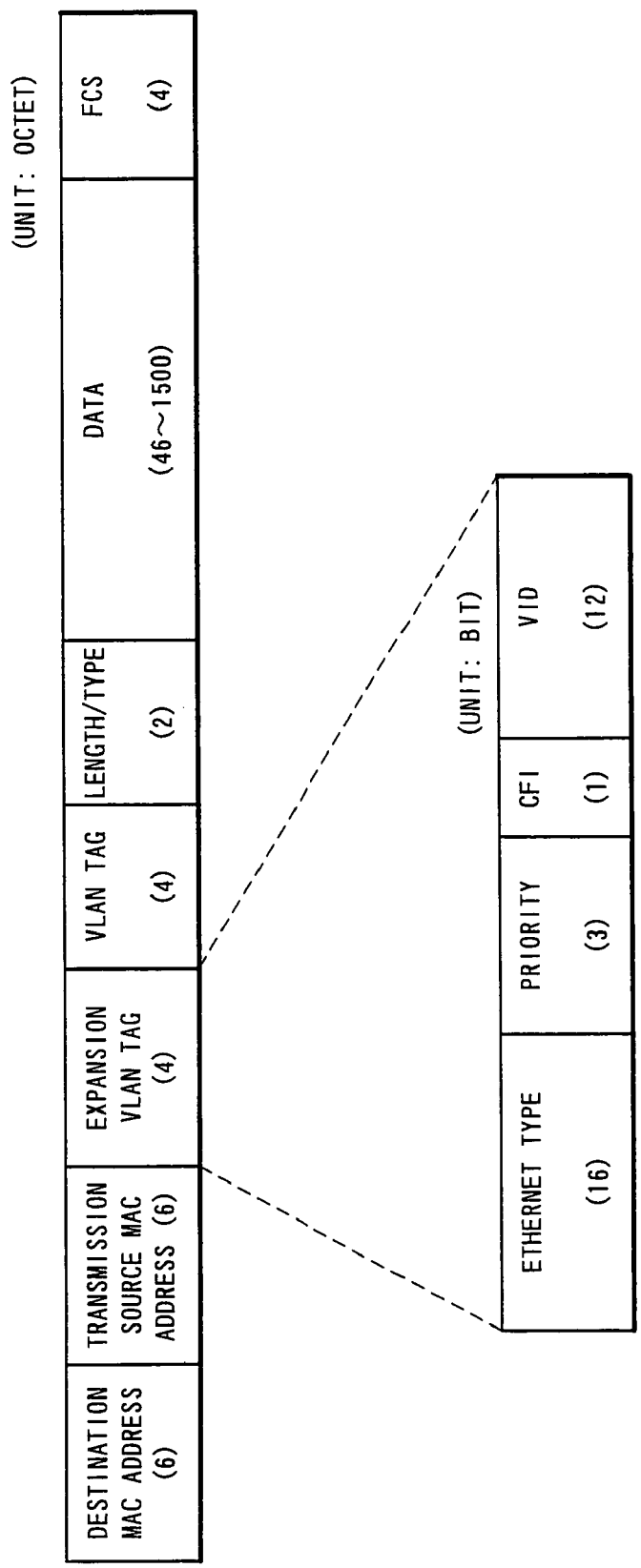
FIG. 4 is a diagram showing a frame format of an expansion VLAN tag according to the first embodiment of the present invention.

FIG. 3 is a block diagram showing an internal structure of the line card 120. The structure is composed of a line interface unit 220 for conducting frame reception processing, a forwarding engine 230 for conducting processing of determining a frame transmission destination and rewriting an expansion VLAN tag (Ether Type, VID), a frame buffer 240 for storing a frame, a search table 250 for storing table information and an SW interface unit 260 for conducting processing of interfacing the SW card 130. Format of the expansion VLAN tag frame is shown in FIG. 4.

Since VLAN and expansion VLAN are well-known art and not directly related to the present invention, no detailed description will be made thereof.

(Description of Operation)

In the following, operation of the first embodiment will be described. First, expansion VLAN tag rewriting operation will be described with reference to FIGS. 1, 3 and 5.

First, processing on the side of input of the L2SW 100 will be described.

Frame applied through a line is received at the line interface unit 220. The received frame is transferred to the forwarding engine 230. The forwarding engine 230 extracts header information from the received frame. Thereafter, once store the entire frame in the buffer memory 240. Next, the forwarding engine 230 searches the extracted header information for a transmission destination line corresponding to a destination MAC address. Table information for the search of a transmission destination line is stored in the search table 250.

FIG. 5 shows a structure of the search table 250. Specify a transmission destination line by using a primary table. The table is composed of a MAC address, a line card corresponding to the MAC address, a line port and an identifier indicating whether the line port is a target of swapping or not.

The SWAP identifier is used as an identifier for determining to which of one-to-one connected areas a line in question belongs (assume here that setting no identifier indicates the area (1) 200 and setting an identifier indicates the area (2) 300, for example).

Next, with a transmission source MAC address as a search key, determine from which area the received frame comes by using the primary table.

When no SWAP identifier is set, determine that the frame is received from the area (1) 200 to search for expansion VLAN tag information of the area (2) 300 by using a secondary table A.

When a SWAP identifier is set, determine that the frame is received from the area (2) 300 to obtain expansion VLAN tag information of the area (1) by using a secondary table B.

The secondary tables A and B have expansion VLAN tag information of the area (1) 200 and the area (2) 300 one-to-one corresponding with each other. The secondary table is composed of Ether Type, VID and port bitmap of an expansion VLAN tag. Secondary table search is executed by using Ether Type and VID of an expansion VLAN tag of a received frame as search keys.

Based on a search result, obtain expansion VLAN tag information of an area corresponding to a transmission destination line to rewrite the expansion VLAN tag (Ether Type, VID). After the completion of the rewriting, the forwarding engine 230 writes the transmission destination line information etc. in an in-device header which is used only in a device and transfers the frame with the header inserted at the top to the SW interface unit. The switch interface unit 260 divides the sent frame into cells for an SW card and transfers the obtained cells to an SW card.

Next, processing on the side of output of an L2SW will be described.

First, the SW interface unit 260 sets up a frame from cells received from the SW card. After the set-up, transfer the frame to the forwarding engine 230. Upon receiving the frame, the forwarding engine 230 extracts an in-device header at the top of the frame and once stores the frame in the frame buffer 240. The forwarding engine 230 recognizes a transmission destination line from the in-device header to send the frame to the line.

Second embodiment of the present invention will be described whose basic structure is the same as that of the above-described embodiment and which enables a plurality of areas to be connected to one area by changing search table arrangement.

Figure 6:
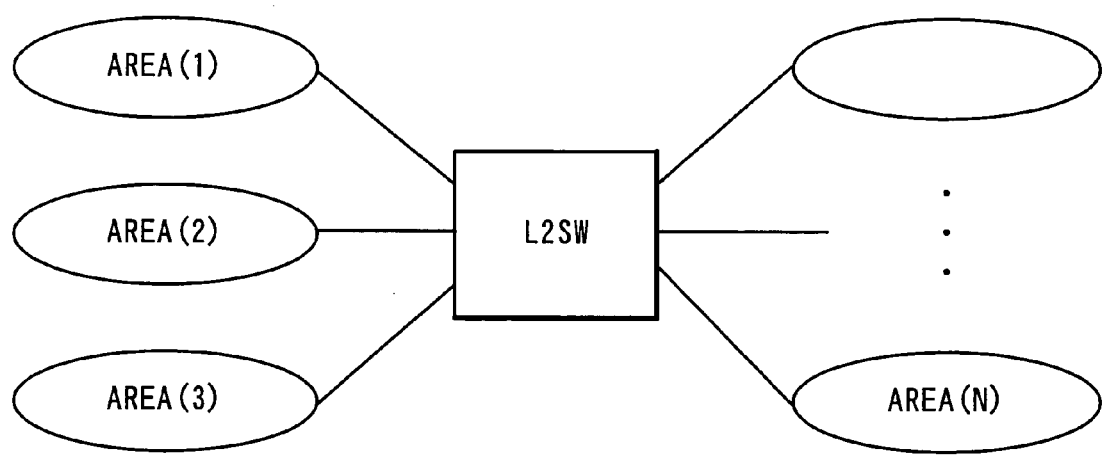
FIG. 6 is a diagram showing arrangement of connection between an L2SW and each area according to a second embodiment of the present invention.
Figure 8:
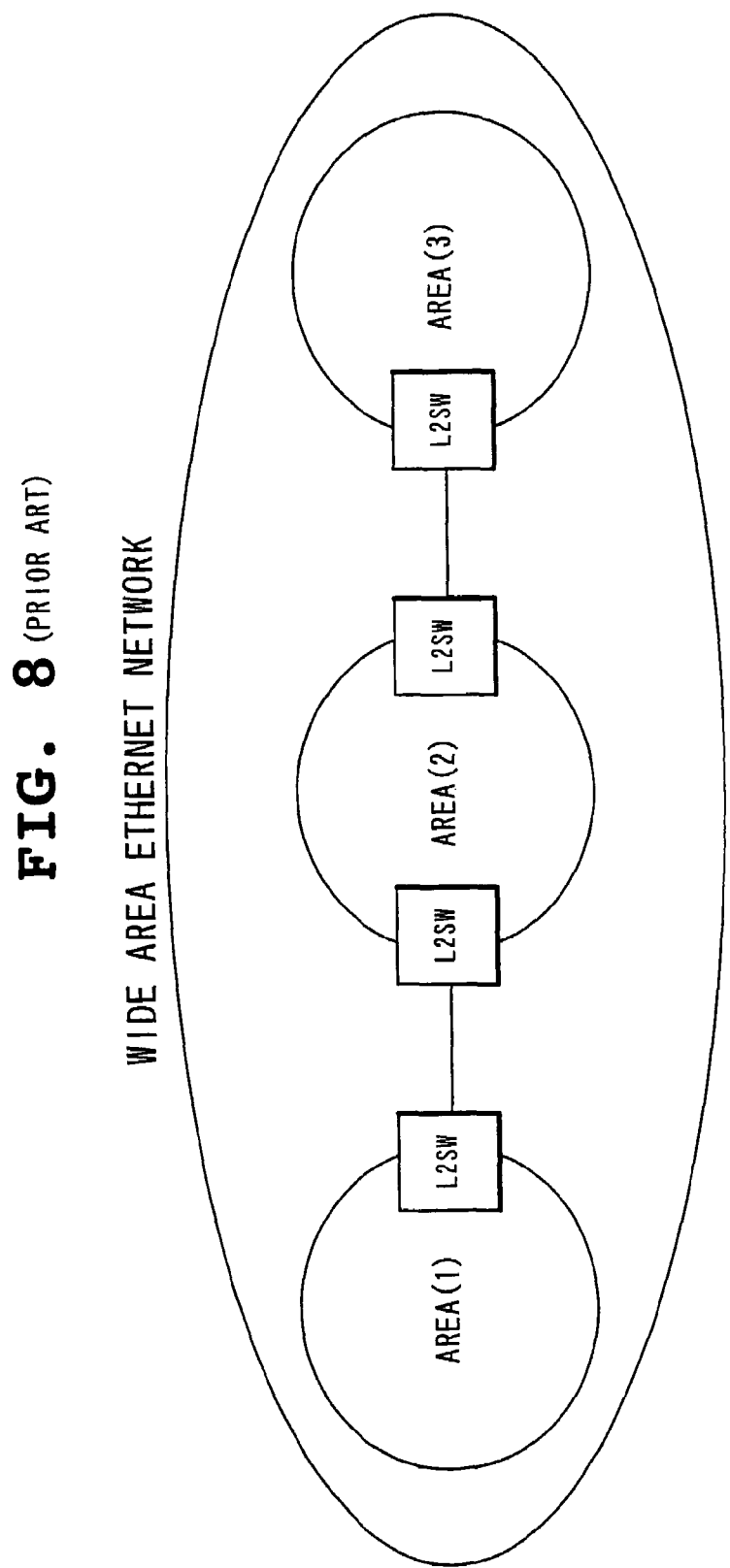
FIG. 8 is a diagram showing a network structure of a wide area Ethernet.
Figure 9:
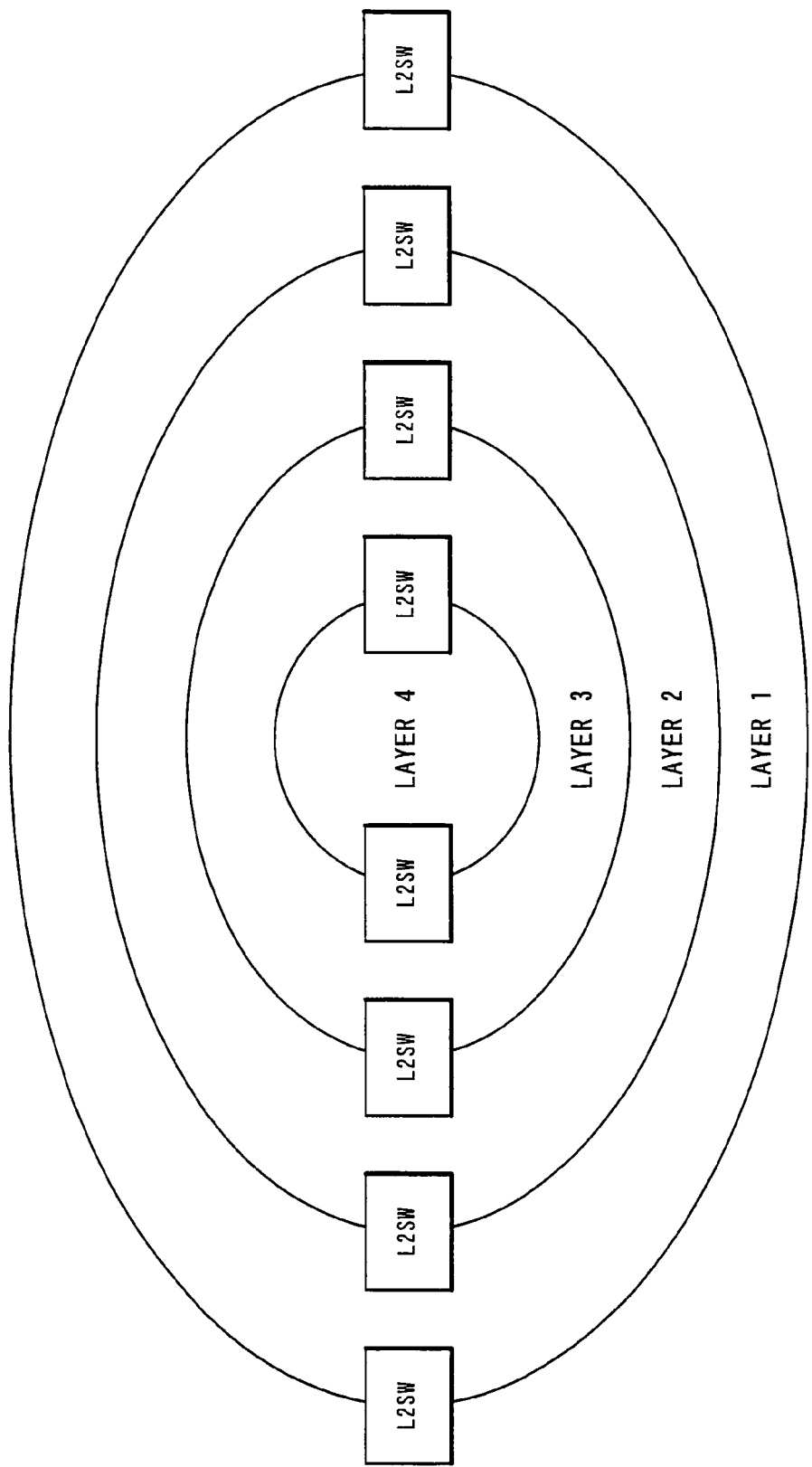
FIG. 9 is a diagram showing a network structure of a wide area Ethernet.

Structure of the second embodiment is illustrated in FIG. 6.

In FIG. 6, connected to one L2SW are 1 to N areas. The number of connectable areas can be increased up to the number of Ethernet lines accommodated by one L2SW. Select an area to be connected to a plurality of areas among the area (1) to the area (N). The selected area is allowed to communicate with all the remaining (N−1) areas. Area allowed to communicate with a plurality of areas can be selected only one in one L2SW.

Next, FIG. 7 shows a table changed from the above-described table arrangement.

Registered in the left side column of the secondary table A is an expansion VLAN tag of an area communicable with a plurality of areas (assume here that the area is the area (1)). Registered in the right side column of the secondary table A is an expansion VLAN tag of an SWAP destination area corresponding to the entry of the expansion VLAN tag of the area (1).

Expansion VLAN tag swapping operation using the table shown in FIG. 7 will be described.

Description will be first made of processing conducted on the input side of the L2SW 100.

Frame applied through a line is received at the line interface unit 220. The received frame is transferred to the forwarding engine 230. The forwarding engine 230 extracts header information from the received frame. Thereafter, once store the entire frame in the buffer memory 240. Next, the forwarding engine 230 searches the extracted header information for a transmission destination line corresponding to a destination MAC address.

Table information for the search of a transmission destination line is stored in the search table 250. Using the primary table shown in FIG. 5, determine whether an SWAP identifier is set on a frame reception line. Determination whether an SWAP identifier is set on a reception line is made by table search using a transmission source MAC address as a search key. When no SWAP identifier is set, determination is made that the line is for a frame received from the area (1). Next, using the secondary table A, obtain expansion VLAN tag information of a plurality of the corresponding areas.

Collate a search result of the secondary table A and a search result of the primary table to obtain expansion VLAN tag information corresponding to the transmission destination line to rewrite an expansion VLAN tag (Ether Type, VID) of the frame by the information. Since operation conducted hereafter is the same as that described above (in the section of "Description of Operation"), no description will be made thereof. When the determination is made that no SWAP identifier is set on the reception line as a result of the search of the primary table, determine that the line is for a frame received from other area than the area 1. In this case, search the secondary table B to obtain expansion VLAN tag information of the corresponding area (1).

Rewrite the frame by the obtained information. Since operation conducted hereafter is the same as that described above (in the section of "Description of Operation"), no description will be made thereof.

Although the foregoing embodiments have been described with respect to a case where one expansion VLAN tag is applied to a frame, when a plurality of expansion VLAN tags are applied at the second and the following stages of a frame, rewrite an expansion VLAN tag located at the top by an expansion VLAN tag corresponding to a transmission destination line. All the expansion VLAN tags may be rewritten by the expansion VLAN tag corresponding to the transmission destination line.

In addition, although the second embodiment has been described with respect to a structure in which a plurality of areas are connected to one area (one-to-N connection), the present invention is also applicable to a structure in which a plurality of areas are connected with each other. In this case, expansion VLAN tag information of a plurality of areas are stored in the secondary table so as to correspond with each other.

As described in the foregoing, the present invention firstly eliminates the need of applying tags to the third and the following stages by conducting SWAP (rewrite) of an expansion VLAN tag, resulting in preventing an increase in overhead in an Ethernet frame.

Secondly, although for connecting areas with each other, one L2SW for gate way is conventionally required at each of an entrance and an exit of each area, since using an L2SW mounted with this expansion VLAN tag SWAP function enables rewriting (Ether Type, VID) of an expansion VLAN tag, LANs whose Ether types are different can be connected with each other to enable each area to be one-to-one or one-to-N connected as described above (in the section of other embodiment of the present invention). As a result, the number of L2SWs in the entire network can be reduced to drastically cut down operation costs of the apparatus.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A layer 2 switch which conducts processing of terminating a layer 2 frame and processing of a layer 2 frame in which an expansion VLAN tag is stacked, comprising:
    a unit which, when a transmission destination area of said frame is different from a transmission source area, rewrites said expansion VLAN tag of said frame into an expansion VLAN tag of the transmission destination area, and
    a first table which stores header information of said frame and information indicates from which area said frame is received so as to correspond with each other, wherein said table includes a second table which stores information of said expansion VLAN tags of said transmission source area and said transmission destination area so as to correspond with each other.

2. The layer 2 switch as set forth in claim 1, wherein, said first table is searched based on the header information of said frame and when the transmission destination area of said frame is different from the transmission source area, the expansion VLAN tag of the transmission destination area is obtained from said second table to rewrite the expansion VLAN tag of said frame.

3. The layer 2 switch as set forth in claim 1, wherein said layer 2 frame is an Ethernet frame.

4. The layer 2 switch as set forth in claim 1, wherein, when a plurality of said expansion VLAN tags are applied to said layer 2 frame, one of i) an expansion VLAN tag at the top is rewritten by said expansion VLAN tag of said transmission destination area, and ii) all the expansion VLAN tags are rewritten by said expansion VLAN tag of said transmission destination area.

5. The layer 2 switch as set forth in claim 1, wherein information of said expansion VLAN tags of said transmission source area and said transmission destination area so as to one-to-one correspond with each other is stored in said second table.

6. The layer 2 switch as set forth in claim 1, comprising a unit for one-to-one connecting LANs which handle said layer 2 frame to enable communication between LANs having the layer 2 frames whose kinds are different.

7. The layer 2 switch as set forth in claim 6, wherein information of said expansion VLAN tags of said transmission source area and said transmission destination area so as to one-to-one correspond with each other is stored in a table.

8. The layer 2 switch as set forth in claim 1, comprising a unit for one-to-N connecting LANs which handle said layer 2 frame to enable communication between LANs having said layer 2 frames whose kinds are different.

9. The layer 2 switch as set forth in claim 8, wherein information of said expansion VLAN tags of said transmission source area and said transmission destination area so as to one-to-N correspond with each other is stored in said second table.

10. The layer 2 switch as set forth in claim 1, comprising a unit for N-to-N connecting LANs which handle said layer 2 frame to enable communication between LANs having said layer 2 frames whose kinds are different.

11. The layer 2 switch asset forth in claim 10, wherein information of said expansion VLAN tags of said transmission source area and said transmission destination area so as to N-to-N correspond with each other is stored in said second table.

12. A method of termination processing of a layer 2 frame and of processing an expansion VLAN tag of a layer 2 frame in which an expansion VLAN tag is stacked, comprising the step of
rewriting, when a transmission destination area of said frame is different from a transmission source area, said expansion VLAN tag of said frame into an expansion VLAN tag of the transmission destination area wherein,
a first table which stores header information of said frame and information indicates from which area said frame is received so as to correspond with each other,
said table including a second table which stores information of said expansion VLAN tags of said transmission source area and said transmission destination area so as to correspond with each other, and
said first table is searched based on the header information of said frame and when the transmission destination area of said frame is different from the transmission source area, the expansion VLAN tag of the transmission destination area is obtained from said second table to rewrite the expansion VLAN tag of said frame.

13. The method of processing an expansion VLAN tag of a layer 2 frame as set forth in claim 12, wherein
said layer 2 frame is an Ethernet frame.

14. The method of processing an expansion VLAN tag of a layer 2 frame as set forth in claim 12, wherein,
when a plurality of said expansion VLAN tags are applied to said layer 2 frame, one of i) an expansion VLAN tag at the top is rewritten by said expansion VLAN tag of said transmission destination area and ii) all the expansion VLAN tags are rewritten by said expansion VLAN tag of said transmission destination area.

15. The method of processing an expansion VLAN tag of a layer 2 frame as set forth in claim 12, wherein
storing information of said expansion VLAN tags of said transmission source area and said transmission destination area so as to one-to-one correspond with each other in said second table.

16. The method of processing an expansion VLAN tag of a layer 2 frame as set forth in claim 12, comprising
a unit for one-to-one connecting LANs which handle said layer 2 frame to enable communication between LANs having the layer 2 frames whose kinds are different.

17. The method of processing an expansion VLAN tag of a layer 2 frame as set forth in claim 16, wherein
storing information of said expansion VLAN tags of said transmission source area and said transmission destination area so as to one-to-one correspond with each other in a table.

18. The method of processing an expansion VLAN tag of a layer 2 frame as set forth in claim 12, comprising
a unit for one-to-N connecting LANs which handle said layer 2 frame to enable communication between LANs having said layer 2 frames whose kinds are different.

19. The method of processing an expansion VLAN tag of a layer 2 frame as set forth in claim 18, wherein
storing information of said expansion VLAN tags of said transmission source area and said transmission destination area so as to one-to-N correspond with each other in said second table.

20. The method of processing an expansion VLAN tag of a layer 2 frame as set forth in claim 12, comprising
a unit for N-to-N connecting LANs which handle said layer 2 frame to enable communication between LANs having said layer 2 frames whose kinds are different.

21. The method of processing an expansion VLAN tag of a layer 2 frame as set forth in claim 20, wherein
storing information of said expansion VLAN tags of said transmission source area and said transmission destination area so as to N-to-N correspond with each other in said second table.

* * * * *